June 27, 1950
R. G. TRUESDALE
2,512,882
SERUM INOCULATOR
Filed Aug. 17, 1949
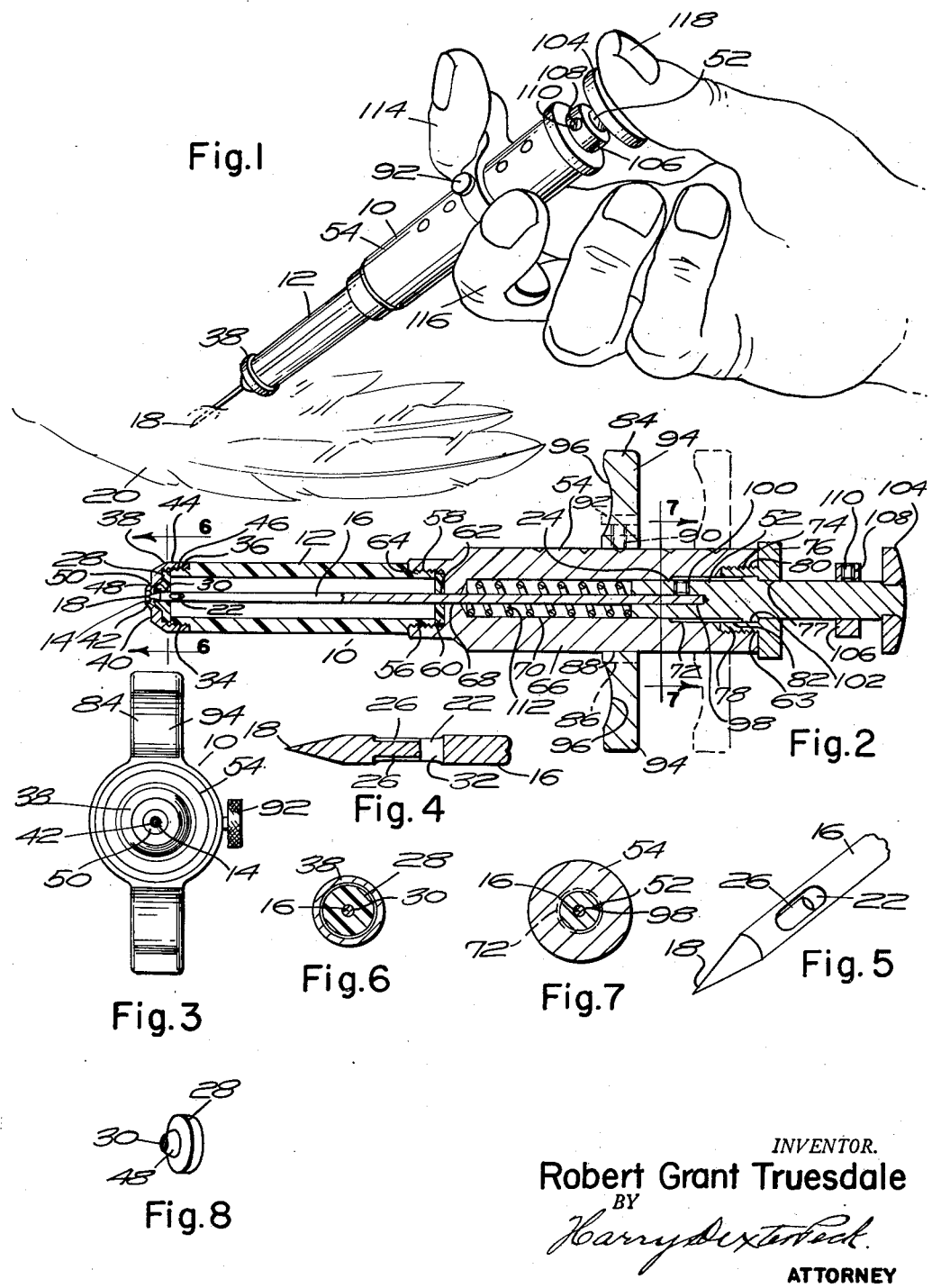
INVENTOR.
Robert Grant Truesdale
BY
Harry Dexter Peck
ATTORNEY Patented June 27, 1950

2,512,882

UNITED STATES PATENT OFFICE 2,512,882

SERUM INOCULATOR

Robert Grant Truesdale, Rehoboth, Mass., assignor to R. G. Truesdale Co., Inc., Rehoboth, Mass., a corporation of Massachusetts Application August 17, 1949, Serial No. 110,801

15 Claims. (Cl. 128—215)

My invention relates to improvements in serum inoculators. While it may be used to inoculate serum of any type in any kind of an animal, human or otherwise, it is particularly adapted for use in vaccinating poultry against Newcastle disease, chicken pox, laryngo-tracheitis, etc.

The present method of inoculating poultry most generally practiced is to dip one or two needles or a knife into a supply of serum contained in an open crock or other holder and then stick the thus coated needle or knife into the bird. A portion of the serum frequently drops off from the penetrating instrument and in time this amounts to a substantial loss of the serum. This method provides for no accurate measurement of the amount of the serum introduced to the bird. The needles or knives are not wiped off between inoculations of birds. It is almost impossible for a single operative to inoculate a bird himself. At least one hand is needed to hold the bird, and it is very difficult for the inoculating party to hold the bird with one hand and to dip the needle or pen knife into the bowl of serum with the other hand while trying to hold the bird. There is great danger of the moving bird knocking over the container and losing all the serum.

In order to inoculate the bird properly, the inoculating party must be seated and, therefore, to achieve efficient inoculation, one sitting party is needed to hold and inoculate the birds and another party is needed to catch the birds and hand them to him, thereby increasing the cost of inoculation.

I am also aware that others have attempted to provide inoculating devices but so far as I am aware these have been crude and clumsy devices or use hollow needles in which it is hard to measure the dose applied.

In accordance with my invention I provide a serum holding device having a movable needle extending through the reservoir and having a pointed end which can be pushed into the bird to be inoculated. I provide means functioning with the needle for normally sealing the serum within said reservoir, and I believe a feature entirely novel to me to be the means to wipe said needle on each inoculating movement thereof, except a measured dose contained within an indentation in the needle which may comprise a groove or a diametric needle hole. I also provide suitable means for reciprocating said needle between its position within the reservoir and its inoculating position.

Many inoculators now on the market require two motions for the application of serum: First, the advancement of the needle from the inoculator, and second, the forcing of serum from the inoculator into the bird. Employing my invention, however, I merely advance the needle from the reservoir and the needle itself gives the measured dose which flows into the bird's veins as the point of the needle is stuck into the bird. Due to the fact that I wipe the needle both ways, namely, as it is being advanced for use and as it is being retracted into the reservoir, I achieve various novel results.

In the first place I substantially eliminate the waste of serum as I wipe off the needle as it emerges from the reservoir, so that the only serum remaining on the needle will be a measured dose in the needle groove or hole sufficient to inoculate a single fowl.

A further feature of my invention resides in the fact that the needle is again wiped externally before being withdrawn within the reservoir so as to positively wipe off any contagious disease from any sick fowl after it has been inoculated and prevent it from being withdrawn into the reservoir and be used in the inoculation of other poultry.

A further object of my invention is to provide an inoculator which is substantially leak-proof.

A further object of my invention is to provide an inoculator which can be used efficiently by a single person, as the reservoir is always loaded with serum enough for a great many inoculations and as it is leak-proof it can be carried in the farmer's pocket without leakage. The farmer can go into the poultry house at night and inoculate the birds by grabbing them on the roost without disturbing them to any great extent.

A further object of my invention is to provide a device which will prevent the serum from contacting the operator.

A further object of my invention is to prevent the exposure of the serum to air, dust or dirt, thus maintaining its strength.

Due to the fact that I only use exactly enough serum to inoculate a single bird and serum is now being put up in bottles allowing a large measured dose for most farmers' use, with my invention I have been able to inoculate 794 birds on less than 100 such measured doses as put out by the serum manufacturer, resulting in a saving of substantially 800% of serum.

A further object of my invention is to provide a novel type of means for reciprocating the needle from a closed to an inoculating position, constructed of a minimum number of parts all of which are of a size so that they may be readily and rapidly machined on a screw machine, and are so simple in their construction and assembly that they may be readily disassembled and cleaned by any farmer when desired.

These and such other objects of my invention as may hereinafter appear will be best understood from a description of the accompanying drawings which illustrate an embodiment thereof.

In the drawings, Fig. 1 is a perspective view illustrating my serum inoculator in use inoculating the wing of a fowl.

Fig. 2 is a medial sectional view taken through my improved inoculator with the needle retracted to closed position.

Fig. 3 is an end view looking from the left in Fig. 2.

Fig. 4 is an enlarged medial sectional view of a portion of a needle I preferably employ.

Fig. 5 is a perspective view of the said portion shown in section in Fig. 4.

Fig. 6 is a sectional view taken along the line 6—6 of Fig. 2.

Fig. 7 is a sectional view taken along the line 7—7 of Fig. 2.

Fig. 8 is a perspective view of the combination sealing element and wiper I preferably employ.

In the drawings, wherein like characters of reference generally indicate like parts throughout, 10 indicates a serum inoculator constructed in accordance with my invention.

In the broader aspects of my invention said serum inoculator includes a preferably transparent serum holding reservoir 12 having a dispensing hole 14 therein, preferably in the lower end thereof, and a needle 16 extending through said reservoir and capable of being reciprocated from a closed position with its pointed end 18 substantially contained in said hole 14 as shown in Fig. 2 to an inoculating position with its pointed end 18 projecting an inoculating distance beyond said hole into the wing 20 of the fowl as shown in Fig. 1.

Said needle 16 has a measured dose receiving indentation 22 therein at a closely spaced distance from the pointed end 18. While said indentation may comprise a groove of any desired shape in the embodiment shown it preferably comprises a diametric needle hole 22.

In the preferred embodiment shown, I provide the diametrically opposite grooves 26 extending outwardly a distance from said hole 22, which grooves function to dispense the measured dose within the hole 22 through a greater area of the inoculated chicken wing or leg by capillary action.

I also preferably provide means 28 in said reservoir forming with the end of said needle when said needle is in a closed position a seal for sealing serum within said reservoir and serving to wipe said needle on each inoculating movement thereof, except the measured dose contained within said indentation or diametric hole 22.

In my preferred embodiment the said means 28 is an annular sealing element mounted within the lower end of said reservoir 12 adjacent said hole 14, having a central hole 30 with its edge adapted to abut the surface of said needle 16 as it passes through said hole to wipe all serum from said needle on each inoculating movement thereof except a measured dose of the serum contained within said diametric needle hole 22 and axial grooves 26 or other type of indentation where employed. It is also obvious that said element 28 functions not only as a wiper to wipe all material off the needle as it is being advanced from the reservoir, but also operates to wipe all material from the end of the needle, including any diseased matter taken from the fowl inoculated as it is being retracted within the reservoir 12.

In the preferred embodiment shown, the serum holding reservoir 12 has the reduced nipple forming lower end 34, preferably externally threaded as at 36. The annular sealing element 28 is clamped between the annular edge of this nipple end and a retaining cap 38 which has a skirt 44 internally threaded at 46 to screw onto the threads 36 of the reservoir. A wall 40 of this cap 38 has a central hole 42 from the edge of which the wall 40 diverges on the inside of the cap to provide a sort of conical seat 50.

In the preferred embodiment shown, the wiping washer or sealing element 28, as shown in Fig. 8, is provided with a conical mound 48 projecting outwardly therefrom, having said needle hole 30 therein, for engaging the conical seat 50 on the retaining cap 38.

In the embodiment shown, the serum inoculator 10 comprises a cylinder 54 and the means to reciprocate the needle 16 within the cylindrical reservoir 12 comprises a plunger 52 reciprocable in the cylinder 54. The lower end of the piston cylinder 54 has an internally threaded socket 56 and the upper end of the cylindrical reservoir 12 has an externally threaded nipple 58 threaded within said socket 56 and an annular resilient washer 60 having a central needle hole 62 is clamped by the reservoir nipple 58 against the base of said socket 56.

In the embodiment shown, the upper cylinder 54, plunger 52 and needle 16 are made of suitable metal. While the reservoir 12 may also be made out of suitable metal, it is preferably made out of a suitable transparent substance such as Lucite (methyl methacrylate) or glass. The lower sealing washer 28 may also be made of brass, if desired, but is preferably made of resilient Tefflon (tetra-fluor ethylene resin), resilient neoprene or any other suitable washer material. The lower washer 28 may also be made of resilient material such as neoprene, rubber, or otherwise.

As stated, I preferably construct the plunger 52 and the cylinder 54 in which it reciprocates of simple parts which may be readily machined on a lathe or automatic screw machine or otherwise.

The cylinder 54 preferably comprises the cylindrical barrel, cylindrical externally throughout the length thereof, having an open end 63, an open end 64 and a relatively thick wall 66. Said cylinder 54 is provided with a central hole having the enlarged socket forming lower portion 56, a portion 68 of a diameter substantially that of the inoculating needle 16, an elongated cylinder forming bore 70 of relatively large diameter, another portion 72 of slightly larger diameter and an internally threaded socket forming portion 74 of still greater diameter in the open end 63 thereof.

I provide a guide nut 76 having a shank 78 externally threaded as at 80, threaded within said socket 74 and a central plunger hole 82 of the diameter of the said cylindrical hole portion 72.

For a purpose to be described, I provide a finger grip 84 having a hub 86 with the hole 88 therein to make said hub 86 longitudinally adjustable throughout the length of the barrel 54, said hub having a radial set screw adjusting hole 90 therein to receive the locking set screw 92. The finger grip 84 has diametrically opposed arms 94 suitably grooved on one side as at 96 to receive the operator's fingers therein as shown in Fig. 1.

It is obvious that with this construction the finger grip may be longitudinally adjustable on said barrel 54.

I also provide the cylindrical plunger 52 of substantially uniform diameter, having a portion thereof reciprocable within the said cylinder 54, having the central hole 98 therein to receive one end of the needle 16, and having a threaded radial hole 100 for a set screw whereby the needle is secured to the plunger. There is a stop collar 102 preferably formed integrally on the plunger 52 having a diameter approximating that of the bore 72 and of the hole 82 in the guide nut 76 but larger than the hole 77 in said nut. Thus the collar 102 is adapted to abut the lower surface of the guide nut 76 when in raised position. Said plunger 52 terminates in a thumb operated button 104 at the outer end thereof spaced above said guide nut 76 a greater distance than that of the desired plunger movement. I also provide the stop collar 106 adjustably mounted on said plunger 52 between said guide nut 76 and button 104. Said stop collar 106 is provided with the radial hole 108 therein to receive the set screw 110 for longitudinal adjustment thereof to adjustably limit the extent to which the needle may be pushed out from the discharge end of the reservoir 12.

I provide the coil spring 112 having one end abutting the annular seat at the elongated cylinder bore portion 70 and having its other end abutting the inner end of the plunger to urge said plunger normally to its retracted position, with the end 18 of the needle closing the hole 14 in the reservoir 12. In all positions, therefore, the elongated needle extends through said coil spring 112, barrel needle bore portion 68, reservoir 12, reservoir wiping washer 28 and cap 38.

In use, the reservoir 12 is filled with the desired amount of serum, normally an entire bottle full as sold by the manufacturer, enough for a multiplicity of doses. When it is desired to use the device, the forefinger 114 and middle finger 116 may have the ends thereof inserted within the grooves 96 in the arms 94 of the finger grip 84 and the thumb 118 pressed against the thumb button 104 in such a manner as to urge the point 18 of the needle an inoculating distance from the reservoir. It is obvious that as the inoculating needle 16 is pushed outwardly the wiping washer 28 will function to wipe all excess serum from the needle as it passes through the hole 30 to without the reservoir, the elongated mound 48 increasing the depth of the hole 30 to insure a positive wiping action. The point of the needle 18 then may be inserted up to the depth of the hole 22 within the leg or wing of the fowl 20 as shown in Fig. 1. As the needle 16 is withdrawn from the fowl, the thumb may be removed and the spring 112 will force the plunger 52 outwardly carrying the needle 16 with it so that the surface of the needle which has been outside the reservoir is also wiped by the washer 28 as the point 18 is retracted within the reservoir 12 so as to fill the hole 14 in the reservoir, it being obvious that this wipes any diseased tissue which may remain on the projecting end of the needle. It is thus obvious that with this construction a minimum amount of serum is used for each inoculation and that no serum is lost except that which is actually used, that the serum is kept in a safe close container free from dust, dirt and contamination at all times, and that it is carefully wiped of all possible contaminating matter prior to withdrawing the needle 16, so that its point 18 again fills the hole 14 in the reservoir.

It is also obvious that, as shown in Fig. 1, the needle may be readily manipulated by a single operative with one hand, while his other hand holds the chicken against its perch.

It is apparent that I have provided a novel type of serum inoculator, with the advantages described above.

It is understood that my invention is not limited to the specific embodiment shown and that various deviations may be made therefrom without departing from the spirit and scope of the appended claims.

What I claim is:

1. A serum inoculator comprising a transparent serum holding reservoir having a dispensing hole, a needle extending through said reservoir along the axis of the inoculator and being reciprocable in said reservoir from a closed position with its pointed end substantially contained in said hole to an inoculating position with its end projecting an inoculating distance beyond said hole, said needle having a measured serum dose receiving indentation therein at a closely spaced distance from said pointed end, fixed wiper means in the said reservoir adjacent the said dispensing hole forming with the pointed end of said needle when said needle is in a closed position a seal for sealing serum within said reservoir, said means wiping said needle on each inoculating movement thereof except a measured dose contained within said indentation, and means including a plunger connected to said needle and extending along the axis of the inoculator to a position to be manually actuated to move said needle from a closed to an inoculating position and spring means coiled about said needle and acting on said plunger to return the needle from its inoculating position to its said closed position.

2. A serum inoculator comprising a transparent serum holding reservoir having a dispensing hole, a needle having a pointed end reciprocable in said reservoir from a closed position with its pointed end substantially contained in said hole to an inoculating position with its end projecting an inoculating distance beyond said hole, having a diametric serum dose receiving hole therein at a closely spaced distance from said pointed end and diametrically opposite grooves extending outwardly from said hole, and an annular sealing element mounted within said reservoir adjacent said hole having an inner periphery adapted to abut said needle as it passes through said hole to wipe all serum from the surface of said needle on each inoculating movement thereof, except a measured dose contained within said diametric needle hole and axial grooves and means to reciprocate said needle from a closed to an inoculating position.

3. A serum inoculator comprising a serum holding reservoir having a dispensing hole, a needle having a pointed end reciprocable in said reservoir from a closed position with its pointed end substantially contained in said hole to an inoculating position with its end projecting an inoculating distance beyond said hole, having a diametric serum dose receiving hole therein at a closely spaced distance from said pointed end and an annular sealing element mounted within said reservoir adjacent said hole having an inner periphery adapted to abut the surface of said needle as it passes through said hole to wipe all serum from said needle on each inoculating movement thereof, except a measured dose contained within said diametric needle hole and means to reciprocate said needle from a closed to an inoculating position.

4. A serum inoculator comprising a serum holding reservoir having a dispensing hole, a needle having a pointed end reciprocable in said reservoir from a closed position with its pointed end substantially contained in said hole to an inoculating position with its end projecting an inoculating distance beyond said hole, having a diametric serum dose receiving hole therein at a closely spaced distance from said pointed end, diametrically opposite grooves extending outwardly from said hole and an annular sealing element mounted within said reservoir adjacent said hole having an inner periphery adapted to abut the surface of said needle as it passes through said hole to wipe all serum from said needle on each inoculating movement thereof, except a measured dose contained within said diametric needle hole and axial grooves and means to reciprocate said needle from a closed to an inoculating position.

5. A serum inoculator according to claim 3 in which the serum holding reservoir has an externally threaded nipple forming end, the annular wiping washer abuts the end of said nipple and a retaining cap is provided having a bottom wall having a needle hole therein and an annular internally threaded side wall threaded on to said reservoir nipple to compress the outer edge of said wiping washer against the end of said nipple.

6. A serum inoculator according to claim 3 in which the serum holding reservoir has a reduced nipple forming end, the annular wiping washer abuts the end of said nipple and a retaining cap is provided having a bottom wall having a needle hole therein and an annular side wall secured to said reservoir nipple to compress the outer edge of said wiping washer against the end of said nipple.

7. A serum inoculator according to claim 3 in which the serum holding reservoir has a reduced nipple forming end, the annular wiping washer abuts the end of said nipple and a retaining cap is provided having a bottom wall having a needle hole therein and an annular side wall secured to said reservoir nipple to compress the outer edge of said wiping washer against the end of said nipple and in which the wiping washer has a conical mound projecting outwardly centrally thereof having said needle hole therein and the bottom wall of said retaining cap has a conical socket on the inner surface thereof for receiving said conical washer mound.

8. A serum inoculator according to claim 3 in which the serum reservoir comprises a cylinder and in which the means to reciprocate the needle within the cylindrical reservoir comprises a plunger reciprocable in a cylinder connected to said cylindrical reservoir.

9. A serum inoculator according to claim 3 in which the serum reservoir comprises a cylinder and in which the means to reciprocate the needle within the cylindrical reservoir comprises a plunger reciprocable in a cylinder connected to said cylindrical reservoir and in which one end of the cylinder has an internally threaded socket and the other end of the cylindrical reservoir has an externally threaded nipple threaded within said cylinder socket and an annular resilient washer having a central needle hole therein is urged by the reservoir nipple against the base of the socket.

10. A serum inoculator according to claim 3 in which the serum holding reservoir has a reduced nipple forming lower end, the annular wiping washer abuts the lower end of said nipple and a retaining cap is provided having a bottom wall having a needle hole therein and an annular side wall secured to said lower reservoir nipple to compress the outer edge of said wiping washer against the end of said nipple and the serum reservoir comprises a cylinder and in which the means to reciprocate the needle within the cylindrical reservoir comprises a plunger reciprocable in a cylinder connected to said cylindrical reservoir and in which the lower end of the cylinder has a socket and the upper end of the cylindrical reservoir has a nipple secured within said cylinder socket and an annular resilient washer having a central needle hole therein is urged upwardly by the reservoir nipple against the base of the socket, and in which the plunger containing cylinder comprises a cylindrical barrel having open upper and lower ends and a relatively thick wall providing a central hole having an enlarged socket forming lower portion, a portion of a diameter substantially that of the inoculating needle above it, and an elongated cylinder forming bore of relatively large diameter above it, a hollow guide nut for guiding the upper end of the plunger is inserted within the upper end of the plunger bore, a plunger of substantially uniform diameter has its lower end reciprocable within the upper end of said cylinder barrel and has a central axial needle end receiving hole extending upwardly a distance therein from the lower end thereof and means are provided for retaining the upper end of the inoculating needle within said hole, the upper end of said plunger is provided with a thumb operated button and stop means are provided on said barrel and plunger to limit the movement of said plunger in both directions, a coil spring is interposed between the lower end of the plunger and the lower end of the cylinder normally urging said plunger to raised position and the inoculating needle extends downwardly through the coil spring, barrel needle bore portion, reservoir, reservoir wiping washer and end cap.

11. A serum inoculator according to claim 3 in which the serum reservoir comprises a cylinder and in which the means to reciprocate the needle within the cylindrical reservoir comprises a plunger reciprocable in a cylinder connected to said cylindrical reservoir, and in which the cylinder comprises a barrel of uniform diameter throughout its length and the plunger has a thumb operated manipulating button on the upper end thereof and a finger grip is provided having a hub longitudinally adjustably securable to said barrel and diametric arms each having the same side wall thereof longitudinally grooved to receive a finger, whereby two fingers may be inserted in said grooves and the thumb inserted over the button to correctly align the inoculator for accurate adjustment prior to the thumb manipulation of the plunger and needle.

12. A serum inoculator according to claim 3 in which the cylinder comprises a barrel of uniform diameter throughout its length and the plunger has a thumb operated manipulating button on the upper end thereof and a finger grip is provided having a hub longitudinally adjustably securable to said barrel and diametric arms each having the same side wall thereof longitudinally grooved to receive a finger, whereby two fingers may be inserted in said grooves and the thumb inserted over the button to correctly align the inoculator for accurate adjustment prior to the thumb manipulation of the plunger and needle.

13. A serum inoculator comprising a reservoir for serum; a needle extending within said reservoir and movable with respect thereto having a serum measuring indentation near one end thereof; a wiper element held at one end of the reservoir for wiping that portion of the surface of said needle, except for the said indentation, which passes through the said element as the needle is moved with respect to said reservoir; means connected with the other end of said reservoir including a plunger to which said needle is secured and by which the needle can be moved manually in one direction with respect to said reservoir and said wiper element, and spring means acting on said plunger to effect return movement of the needle in the opposite direction.

14. A serum inoculator comprising a reservoir for the serum; a reciprocable needle extending through said reservoir along the axis thereof having a pointed end to be projected into the bird to be inoculated, said needle being solid except for an indentation for carrying a predetermined dose of serum; wiping means held in fixed position at the dispensing end of said reservoir for removing serum from the surface of the needle in excess of said dose; and means for reciprocating the said needle so that the said indentation will enter said reservoir through said wiping means on one stroke to be charged with the serum, and on the other stroke will be pushed out of the reservoir through said wiping means into inoculating position.

15. A serum inoculator comprising a reservoir for serum; a reciprocable needle having a portion movable into and out of said reservoir for insertion in and removal from the bird to be inoculated, said needle having in that portion thereof which enters and exits from said reservoir an indentation of such size as to pick up and convey from the reservoir an amount of serum sufficient for a single inoculation; wiping means fixed in position at the dispensing end of said reservoir for removing from said needle the serum other than the said amount; and means connected to said needle and operable thereon for imparting reciprocating strokes thereto for drawing the said portion into the reservoir to charge the indentation with serum and to project it therefrom to an exposed position for inoculating use.

ROBERT GRANT TRUESDALE.

REFERENCES CITED

The following references are of record in the file of this patent:

UNITED STATES PATENTS

| Number | Name | Date |
|---|---|---|
| 786,358 | Houghton | Apr. 4, 1905 |
| 2,091,438 | Epstein | Aug. 31, 1937 |
| 2,324,535 | Powell | July 20, 1943 |
| 2,345,070 | Powell | Mar. 28, 1944 |

FOREIGN PATENTS

| Number | Country | Date |
|---|---|---|
| 621,770 | Germany | Nov. 13, 1935 |